June 23, 1959 J. E. DAVIS 2,892,024

COLOR TELEVISION RECEIVER

Filed June 13, 1956 2 Sheets-Sheet 1

Inventor
JOSEPH E. DAVIS
by
Mason, Kolehmainen, Rathburn and Wyss
Attorneys

COLOR TELEVISION RECEIVER

Filed June 13, 1956 2 Sheets-Sheet 2

Inventor
JOSEPH E. DAVIS
by
Mason, Kolehmainen, Rathburn and Wyss
Attorneys

United States Patent Office 2,892,024

Patented June 23, 1959

2,892,024

COLOR TELEVISION RECEIVER

Joseph E. Davis, Buffalo, N.Y., assignor, by mesne assignments, to Sylvania Electric Products Inc., Wilmington, Del., a corporation of Delaware Application June 13, 1956, Serial No. 591,213

4 Claims. (Cl. 178—5.4)

Figure 1:
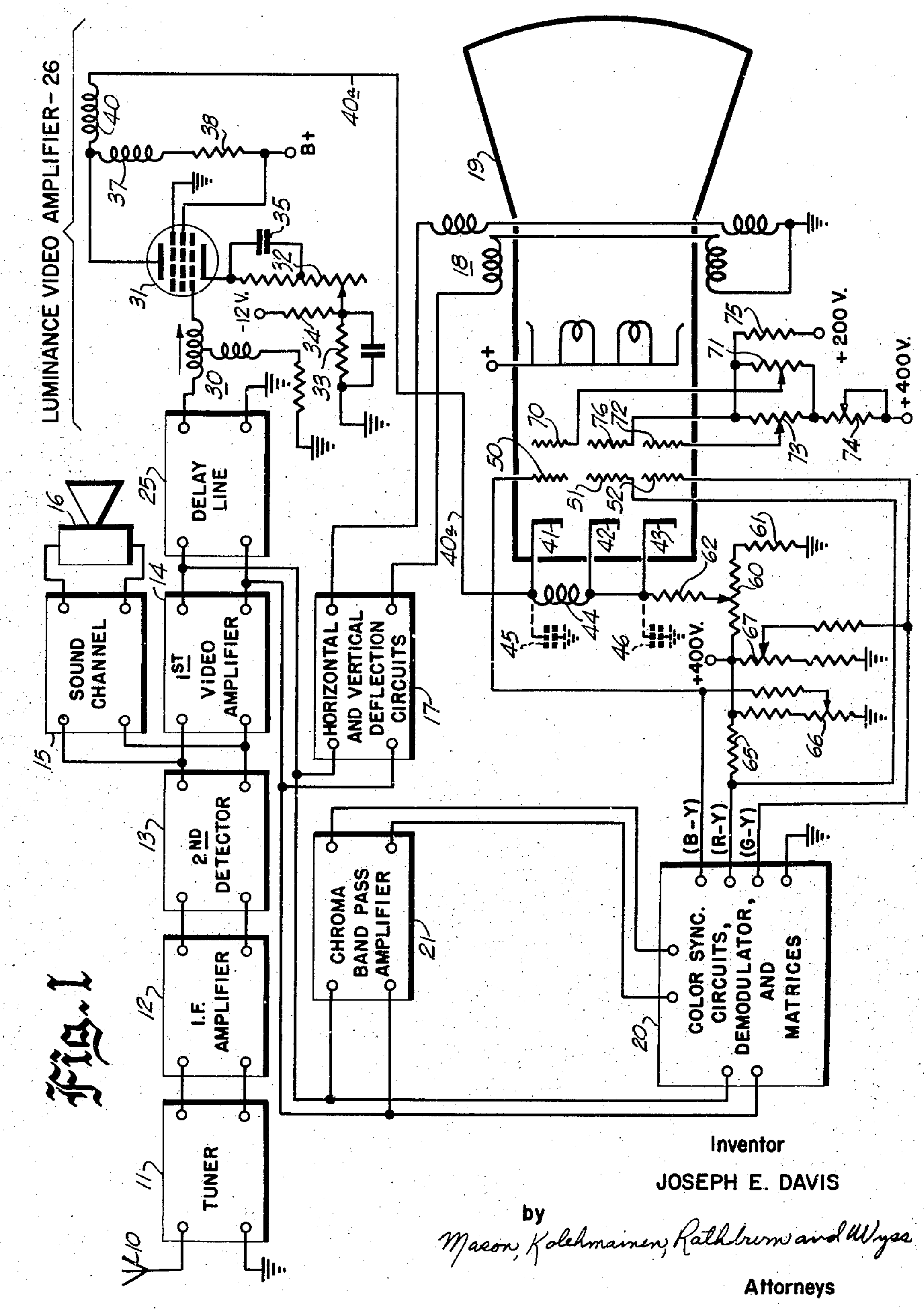

The present invention relates to color television receivers, more particularly to color television receivers of the type which employ a three-gun color picture tube, and the invention has for an object the provision of facilities for substantially increasing the detail and definition of the image reproduced on the screen of a three-gun color picture tube.

Most of the present day color television receivers employ a color picture tube which is provided with a plurality of electron beam producing guns corresponding to the chrominance or color components of a received color television signal. In many instances the desired red, blue and green signals are produced by applying the luminance or brightness signal component to the cathodes of these guns in parallel and applying so-called color difference signals individually to the control grid of each gun. However, when the cathodes of all three guns are connected in parallel and driven from a common luminance amplifier stage, the shunt capacity of the parallel connected cathodes is sufficiently large that the higher frequency components of the luminance signal are severely attenuated. The resolution or definition of the image reproduced on the screen of the color picture tube is, therefore, relatively low, a resolution of 250 lines being considered optimum in present-day commercial color television receivers.

It is, therefore, an object of the present invention to provide a new and improved color television receiver wherein a plural gun color picture tube is employed which provides a reproduced image of substantially increased detail and definition.

It is a further object of the present invention to provide a new and improved color television receiver of the above described type wherein substantially increased detail and resolution is achieved in the reproduced image without substantially increasing the cost or complexity of the receiver.

It is a still further object of the present invention to provide a new and improved color television receiver of the above described type wherein the transient response of the receiver is substantially increased.

Briefly, in accordance with one aspect of the invention, the luminance signal component of the received color television signal is not applied equally to the cathodes of all three guns but instead a coupling circuit is provided between individual cathodes so that a relatively wide band luminance signal is impressed upon the cathode of the gun which contributes most substantially to the detail or resolution of the reproduced image. Under present-day television standards the monochrome or illuminant C standard is obtained by adding unequal portions of the red, blue and green signals in the proportions 0.59 green, 0.30 red and 0.11 blue. Accordingly, the wide band luminance signal is applied only to the green and red guns, in a preferred embodiment, the blue gun receiving a relatively narrow band-width luminance signal. With this arrangement, the resolution of the color television receiver is substantially increased and the transient response of the receiver is improved so that a color picture of substantially improved quality is provided.

Figure 2:
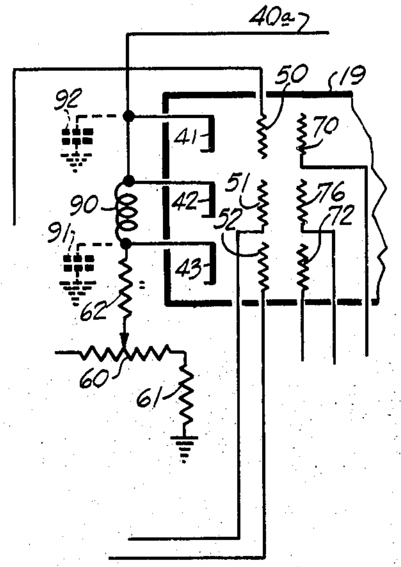
Figure 3:
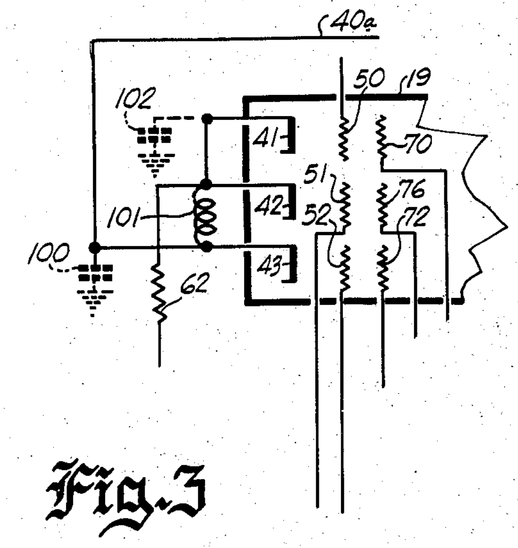

The invention, both as to its organization and method of operation, together with further objects and advantages thereof, will best be understood by reference to the following detailed description taken in connection with the accompanying drawings, in which:

Fig. 1 is a schematic diagram, partly in block diagram form of a color television receiver embodying the principles of the present invention; and Figs. 2 and 3 are schematic diagrams of a portion of a color television receiver illustrating alternative embodiments of the present invention.

Referring now to the drawings, and more particularly to Fig. 1 thereof, the present invention is therein illustrated in conjunction with a color television receiver which includes an antenna system 10 which is connected to a tuner 11 wherein the received color television signal is converted into a suitable corresponding intermediate frequency signal which is supplied to an intermediate frequency amplifier 12. The output of the amplifier 12 is connected to a second detector 13 wherein the composite color television signal is detected and is supplied to a first video amplifier 14. The output of the second detector 13 is supplied to the sound channel 15 of the receiver so that the accompanying sound signal may be supplied to a suitable loudspeaker 16. The horizontal and vertical synchronizing pulse components of the composite video signal are also supplied to the horizontal and vertical deflection circuits 17 so as to produce suitable scanning wave forms in the deflection yoke 18 which surrounds the neck of the three-gun color picture tube 19, the yoke 18 functioning to deflect the three independent electron beams formed within the picture tube 19 in unison so as to produce the conventional raster on the screen of the picture tube 19. The composite color television signal is also supplied to the color sync circuits, demodulators and matrices 20, the circuit 20 functioning to develop three color difference signals which are impressed upon the control grids of the three electron guns in the picture tube 19 in a manner to be described in more detail hereinafter. In addition, the chrominance signal components of the color television signal are amplified in a chroma band pass amplifier 21, the output of the band pass amplifier 21 being supplied to the demodulator portions of the circuit 20 to provide the required color difference signals in a manner readily understood by those skilled in the art. The output of the video amplifier 14 is also connected through a luminance channel delay line 25 to provide the necessary time delay between the luminance and chrominance signals, the output of the delay line 25 being connected to a luminance video amplifier 26 which supplies an amplified luminance signal to the three electron guns of the color picture tube 19. The circuit components 10 to 25, inclusive, may all be of conventional well-known construction and hence a detailed description thereof is considered unnecessary herein.

Considering now the portions of the receiver of Fig. 1 which incorporate features of the present invention, the wide band luminance signal which is transmitted through the delay line 25 is coupled through a 3.58 megacycle trap circuit 30 to the control grid of a luminance amplifier tube 31, the trap circuit 30 providing rejection at the frequency of the color subcarrier. The cathode of the tube 31 is connected through the contrast control potentiometer 32 and a fixed bias resistor 33 to ground, the arm of the potentiometer 32 also being connected through a resistor 34 to a minus 12 volt supply to provide the correct bias conditions for the tube 31, the contrast control potentiometer 32 being partially bypassed by means of the condenser 35. The anode of the luminance amplifier tube 31 is connected through the coupling coil 37 and the anode load resistor 38 to the B+ supply, the screen grid of the tube 31 also being connected to the B+ supply and the suppressor grid of the tube 31 being connected to ground.

In order to couple the amplified luminance signal developed by the tube 31 to the three electron guns of the color picture tube 19, the anode of the tube 31 is connected through the series coupling coil 40 and by way of conductor 40*a* to the cathode 41 of the blue gun in the picture tube 19. However, in accordance with an important feature of the invention, the cathode 42 of the red gun and the cathode 43 of the green gun are not directly connected in parallel with the cathode 41 but instead a coupling coil 44 is connected between the cathode 41 and the parallel connected cathodes 42 and 43. Preferably, the coil 44 is directly connected between the cathode terminals of the picture tube socket so that the capacity to ground of the anode circuit of the tube 31, the conductor 40*a* and the cathode 41, which have been indicated in dotted lines in Fig. 1 as the capacitor 45, is separated from the capacity to ground of the cathodes 42 and 43, this latter capacity being indicated in Fig. 1 in dotted lines as the capacitor 46. The B—Y signal developed by the circuit 20 is connected to the control grid 50 of the blue gun in the picture tube 19, the R—Y signal developed by the circuit 20 is connected to the control grid 51 of the red gun and the G—Y signal developed by the circuit 20 is connected to the control grid 52 of the green gun.

In order to provide the correct gain and background levels for each of the red, blue and green guns so that these guns will contribute in the correct ratio to provide the standard illuminant C signal on the screen of the picture tube 19, the D.C. potential of the cathodes of the three guns is controlled by means of the master brightness potentiometer 60 which is connected from a relatively high B+ potential through the resistor 61 to ground, the arm of the potentiometer 60 being connected through the common resistor 62 to the cathodes 42 and 43 and through the coupling coil 44 to the cathode 41. The D.C. potential of the control grid 51 of the red gun is held fixed by connecting this control grid through the resistor 65 to the plus 400 volt supply, the D.C. level of the control grid 50 of the blue gun being varied by means of the potentiometer 66 and the potential of the control grid 52 of the green gun being varied by means of the potentiometer 67. In addition, the screen grid 70 of the blue gun is connected to the arm of a potentiometer 71 and the screen grid 72 of the green gun is connected to the arm of a potentiometer 73, the potentiometers 71 and 73 being connected through the master screen potentiometer 74 to the plus 400 volt supply and through the resistor 75 to a plus 200 volt supply. The screen 76 of the red gun is connected to the junction point of the potentiometers 71 and 73 and the resistor 75. Under present day television standards a white signal is comprised of fifty-nine percent of the green signal, thirty percent of the red signal and eleven percent of the blue signal. Accordingly, the potentiometers 60, 66, 67, 71, 73 and 74 are adjusted so that with a common luminance signal impressed upon the cathode of each gun the color outputs therefrom combine in the above described ratio to produce the desired luminance components of the color television image.

In considering the operation of the luminance video amplifier 26 and the compensating coil 44, it is pointed out that the compensating coil 44 functions to reduce the shunt capacity associated with the cathodes 42 and 43 of the red and green guns respectively, so that a relatively wide band width luminance signal may be impressed upon these cathodes. If the compensating coil 44 is eliminated and all three of the cathodes 41, 42 and 43 are connected together the shunt capacities 45 and 46 are connected directly in parallel and constitute sufficient shunt capacity to limit the high frequency components of the luminance signal impressed upon these cathodes. Normally, the combined shunt capacities 45 and 46 are sufficiently great to limit the frequency response to an extent such that the optimum resolution of the reproduced image is about 250 lines. However, with the arrangement of the present invention this resolution can be increased to approximately 325 lines with the result that a color picture of substantially increased quality is produced. The coupling coils 37, 40 and 44 together with the shunt capacities 45 and 46 comprise a coupling means which has a relatively narrow band width terminal and a relatively wide band width terminal. The red and green guns, and primarily the green gun, contribute the major portion of the detail of the reproduced image, since the luminance signal is combined in the above described ratios of .59 green, .30 red and .11 blue, so that the red and green guns are connected to the wide band width terminal and the blue gun is connected to the narrow band width terminal. In the illustrated embodiment the series coupling coil 40 and the shunt capacity 45 are so chosen that the band width of the coupling system is relatively narrow at the junction of these circuit elements, i.e., in the order of three megacycles, and the blue gun cathode 41 is connected to this narrow band width terminal. On the other hand, the coupling coil 44 and the shunt capacity 46 are so arranged that a relatively wide band width, which is substantially flat to 4.5 megacycles, is obtained and the red and green cathodes 42 and 43 are connected to this wide band width terminal. Accordingly, a wide band width luminance signal is impressed upon the red and green guns of the picture tube 19 which contribute approximately ninety percent of the fine detail of the reproduced image so that the resolution of the reproduced image is substantially increased. It has been found that with the arrangement of the present invention, the resolution may be increased approximately 75 lines from that obtainable when all three cathodes are connected in parallel. By way of illustration only, it has been found that with a shunt capacity 45 of approximately 23 micromicrofarads and a shunt capacity 46 of approximately 21 micromicrofarads the coil 37 should have an inductance of 313 microhenries, the coil 40 should have an inductance of 205 microhenries, and the coil 44 should have an inductance of 165 microhenries. The coils 37 and 40 are separately pie wound coils which are overcoupled and are tuned by a single tuning slug. However, the coil 44 is not coupled to the coils 37 and 40 but instead is preferably connected directly to the indicated cathode terminals on the socket of the picture tube 19.

In Fig. 2 there is shown an alternative embodiment wherein the shunt capacity associated with the green gun cathode is further reduced. Referring to this figure, a compensating coil 90 is connected between the red gun cathode 42 and the green gun cathode 43 so that the shunt capacity 91 is due solely to the green gun itself, the blue gun cathode 41 being connected to the red gun cathode 42 so that the shunt capacity 92 associated with these elements is somewhat increased over the capacity 45 in the receiver of Fig. 1. In the arrangement of Fig. 2 the green gun, which contributes approximately sixty percent of the picture detail may have impressed thereon an even wider band width luminance signal since the shunt capacity 91 associated therewith is of very small value.

In the coupling arrangements of Figs. 1 and 2 the narrow band width terminal, to which either the blue gun cathode or the red and blue gun cathodes are connected, has been illustrated as the intermediate terminal of the coupling circuit with the wide band width terminal as the end termination of the coupling system. However, it will be understood that the wide band width signal may be derived from an intermediate section of the coupling circuit with the narrow band section forming the end termination of the coupling system. In Fig. 3 there is shown such an alternative arrangement wherein the green gun cathode 43 is connected to the conductor 40*a* so that the shunt capacity 100 consists of the anode circuit capacity of the tube 31, the lead capacity of the conductor 40*a* and the gun capacity of the green gun. The compensating coil 101 is then connected between the green gun cathode 43 and the red and blue gun cathodes 42 and 41 so that the shunt capacity 102 associated with these cathodes is isolated from the shunt capacity 100. In the arrangement of Fig. 3 the coupling coils 37, 40 and 101 are so chosen with respect to the shunt capacities 100 and 102 that a relatively large portion of the energy spectrum is supplied to the green gun cathode 43, *i.e.*, a relatively wide band width is provided at the junction of the coupling coil 101 and the shunt capacity 100, while a relatively small portion of the total energy available is extracted at the blue and red gun cathodes, i.e., the junction point of the coupling coil 101 and the shunt capacity 102.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a color television receiver adapted to receive a color television signal having a luminance signal component and a plurality of chrominance signal components, a color picture tube having a plurality of electron beam producing guns corresponding to the chrominance components of a received color television signal, means for amplifying the luminance signal component of a received color television signal, and coupling means for supplying said amplified luminance signal component to the cathodes of said plurality of electron guns, said coupling means including a coil having one of its terminals connected directly to the cathode of one of said guns and its other terminal connected directly to a cathode of another of said guns.

2. In a color television receiver adapted to receive a color television signal having a luminance signal component and a plurality of chrominance signal components, a color picture tube having three electron beam producing guns corresponding to the red, blue and green components of a received color television signal, means for amplifying the luminance signal component of a received color television signal, and coupling means for supplying an amplified luminance signal to said green electron gun and an amplified signal to said red and blue electron guns, said coupling means including an inductance coil connected directly across the cathodes of a pair of said guns.

3. In a color television receiver adapted to receive a color television signal having a luminance signal component and a plurality of chrominance signal components, a color picture tube having three electron beam producing guns corresponding to the red, blue and green components of a received color television signal, means for amplifying the luminance signal component of a received color television signal, and coupling means for supplying said amplified luminance signal to said red and green electron guns and said amplified luminance signal to said blue electron gun, said coupling means consisting of a coil connected directly across the cathodes of the green and red guns and a connection for applying the amplified luminance signal component to one end of said coil.

4. In a color television receiver adapted to receive a color television signal having a luminance signal component and a plurality of chrominance signal components, a color picture tube having three electron beam producing guns corresponding to the red, blue and green components of a received color television signal, means for amplifying the luminance signal component of a received color television signal, means for connecting said amplified luminance signal to said guns, said last mentioned means including means for connecting the cathode of said blue electron gun to the cathode of the red electron gun, and a coil having its terminals connected directly to the cathodes of said red and green guns network.

References Cited in the file of this patent

UNITED STATES PATENTS 2,722,563 Loughlin ---------------- Nov. 1, 1955

OTHER REFERENCES

RCA, Color Television Receiver, Model 21-CT-661U, page 26, May 4, 1955.